United States Patent
Beall et al.

(10) Patent No.: US 9,928,596 B2
(45) Date of Patent: Mar. 27, 2018

(54) MOTION CORRECTED IMAGING SYSTEM

(71) Applicant: THE CLEVELAND CLINIC FOUNDATION, Cleveland, OH (US)

(72) Inventors: Erik B. Beall, Westlake, OH (US); Mark J. Lowe, Columbus, IN (US)

(73) Assignee: The Cleveland Clinic Foundation, Cleveland, OH (US)

( * ) Notice: Subject to any disclaimer, the term of this patent is extended or adjusted under 35 U.S.C. 154(b) by 138 days.

(21) Appl. No.: 15/149,824

(22) Filed: May 9, 2016

(65) Prior Publication Data
US 2016/0328852 A1 Nov. 10, 2016

Related U.S. Application Data

(60) Provisional application No. 62/158,017, filed on May 7, 2015.

(51) Int. Cl.
| | |
|---|---|
| *G06K 9/00* | (2006.01) |
| *G06T 7/00* | (2017.01) |
| *G06T 5/00* | (2006.01) |
| *G06T 7/20* | (2017.01) |
| *G06N 7/00* | (2006.01) |
| *G06T 7/38* | (2017.01) |
| *G06T 7/215* | (2017.01) |

(52) U.S. Cl.
CPC ........... *G06T 7/0038* (2013.01); *G06N 7/005* (2013.01); *G06T 5/001* (2013.01); *G06T 7/0012* (2013.01); *G06T 7/20* (2013.01); *G06T 7/215* (2017.01); *G06T 7/38* (2017.01); *G06T 2207/10088* (2013.01); *G06T 2207/20182* (2013.01); *G06T 2207/20201* (2013.01); *G06T 2207/30016* (2013.01)

(58) Field of Classification Search
None
See application file for complete search history.

(56) References Cited

PUBLICATIONS

Scholvinck, M.L., Maier, A., Ye, F.Q., Duyn, J.H., Leopold, D.A., 2010. Neural basis of global resting-state fMRI activity. Proc Natl Acad Sci U S A 107, 10238-10243.
Sheltraw, D., Inglis, B., Oct. 12, 2012, A simulation of the effects of receive field contrast on motion-corrected EPI time series. arXiv:med-ph/1210.3633v1.
(Continued)

*Primary Examiner* — Atiba O Fitzpatrick
(74) *Attorney, Agent, or Firm* — Tarolli, Sundheim, Covell & Tummino LLP

(57) ABSTRACT

Systems and methods are provided for detecting motion in an imaging system. A time series of volumetric images of a region of interest are captured at the imaging system. Each volumetric image of the time series of volumetric images is captured as a series of two-dimensional slices of the region of interest. A representative value is calculated for each voxel to create a representative volumetric dataset representing the region of interest. For each slice of the series of two-dimensional slices, a simulated volumetric time series is generated, including time series data for the slice and the calculated representative value at all times for the other slices of the series of two-dimensional slices. A volumetric registration is performed on each of the simulated volumetric time series to provide a set of estimated motion parameters for the slice associated with the simulated volumetric time series.

20 Claims, 4 Drawing Sheets

(56) References Cited

PUBLICATIONS

Smith, S.M., Jenkinson, M., Woolrich, M. W., Beckmann, C.F., Behrens, T.E., Johansen-Berg, H., Bannister, P.R., De Luca, M., Drobnjak, I., Flitney, D.E., Niazy, R.K., Saunders, J., Vickers, J., Zhang, Y., De Stefano, N., Brady, J,M., Matthews, P.M., 2004. Advances in functional and structural MR image analysis and implementation as FSL. Neuroimage 23 Suppl 1, S208-219.

Thesen, S., Heid, O., Mueller, E., Schad, L.R., 2000. Prospective acquisition correction for head motion with image-based tracking for real-time fMRI. Magn Reson Med 44, 457-465.

Van de Moortele, P.F., Pfeuffer, J., Glover, G.H., Ugurbil, K., Hu, X., 2002. Respiration-induced B0 fluctuations and their spatial distribution in the human brain at 7 Tesla. Magn Reson Med 47, 888-895.

Van Dijk, K.R., Sabuncu, M.R., Buckner, R.L., 2012. The influence of head motion on intrinsic functional connectivity MRI. Neuroimage 59, 431-438.

Xu, N., Fitzpatrick, J.M., Li, Y., Dawant, B.M., Pickens, D.R., Morgan, V.L., 2007. Computer-generated fMRI phantoms with motion-distortion interaction. Magn Reson Imaging 25, 1376-1384.

Beall, Erik B., and Mark J. Lowe. "SimPACE: generating simulated motion corrupted BOLD data with synthetic-navigated acquisition for the development and evaluation of SLOMOCO: a new, highly effective slicewise motion correction." Neuroimage 101 (2014): 21-34.

Roche, Alexis, "A four-dimensional registration algorithm with application to joint correction of motion and slice timing in fMRI." IEEE transactions on medical imaging 30.8 (2011): 1546-1554.

PCT International Search Report and Written Opinion for PCT/US2016/031469 dated Aug. 5, 2016, pp. 1-12.

Aksoy, M., Forman, C., Straka, M., Cukur, T., Hornegger, J., Bummer, R., 2012. Hybrid prospective and retrospective head motion correction to mitigate cross-calibration errors. Magn Reson Med 67, 1237-1251.

Andersson, J.L., Hutton, C., Ashburner, J., Turner, R., Friston, K., 2001. Modeling geometric deformations in EPI time series. Neuroimage 13, 903-919.

Ardekani, B.A., Bachman, A.H., Helpern, J.A., 2001. A quantitative comparison of motion detection algorithms in fMRi. Magn Reson Imaging 19, 959-963.

Beall, E., Lowe, M., Alberts, J.L., Frankemolle, A.M., Thota, A.K., Shah, C., Phillips, M.D., 2013. The Effect of Forced-Exercise Therapy for Parkinson's Disease on Motor Cortex Functional Connectivity. Brain Connect.

Bullmore, E.T., Brammer, M.J., Rabe-Hesketh, S., Curtis, V.A., Morris, R.G., Wlliams, S.C., Sharma, T., McGuire, P. K., 1999. Methods for diagnosis and treatment of stimulus-correlated motion in generic brain activation studies using fMRI. Hum Brain Mapp 7, 38-48.

Bydder, M., Larkman, D.J., Hajnal, J.V., 2002. Detection and elimination of motion artifacts by regeneration of k-space. Magn Reson Med 47, 677-686.

Cox, R.W., 1996. AFNI: software for analysis and visualization of functional magnetic resonance neuroimages. Comput Biomed Res 29, 162-173.

Cox, R.W., Jesmanowicz, A., 1999, Real-time 3D image registration for functional MRI. Magn Reson Med 42, 1014-1018.

Dold, C., Zaitsev, M., Speck, O., Firle, E.A., Hennig, J., Sakas, G., 2005. Prospective head motion compensation for MRI by updating the gradients and radio frequency during data acquisition. Med Image Comput Comput Assist Interv 8, 482-489.

Drobnjak, I., Gavaghan, D., Suli, E., Pitt-Francis, J., Jenkinson, M., 2006. Development of a functional magnetic resonance imaging simulator for modeling realistic rigid-body motion artifacts. Magn Reson Med 56, 364-380.

Field, A.S., Yen, Y.F., Burdette, J.H., Elster, A.D., 2000. False cerebral activation on BOLD functional MR images: study of low-amplitude motion weakly correlated to stimulus. AJNR Am J Neuroradiol 21, 1388-1396.

Foerster, B.U., Tomasi, D., Caparelli, E.C., 2005. Magnetic field shift due to mechanical vibration in functional magnetic resonance imaging. Magn Reson Med 54, 1261-1267.

Forman, C., Aksoy, M., Hornegger, J., Bammer, R., 2010. Self-encoded marker for optical prospective head motion correction in MRI. Med image Comput Comput Assist Interv 13, 259-266.

Fox, M.D., Zhang, D., Snyder, A.Z., Raichle, M.E., 2009. The global signal and observed anticorrelated resting state brain networks. J Neurophysiol 101, 3270-3283.

Freire, L., Mangin, J.F., 2001. Motion correction algorithms may create spurious brain activations in the absence of subject motion. Neuroimage 14, 709-722.

Freire, L., Roche, A., Mangin, J.F., 2002. What is the best similarity measure for motion correction in fMRI time series? IEEE Trans Med Imaging 21, 470-484.

Friston, K.J., Ashburner, J., Frith, C.D., Poline, J.B., Heather, J.D., Frackowiak, R.S., 1995. Spatial Registration and Normalization of Images. Human Brain Mapping 2, 165-189.

Friston, K.J., Williams, S., Howard, R., Frackowiak, R.S., Turner, R., 1996. Movement-related effects in fMRI time-series, Magn Reson Med 35, 346-355.

Gunther, M., Feinberg, D.A., 2004. Ultrasound-guided MRI: preliminary results using a motion phantom. Magn Reson Med 52, 27-32.

Hallquist, M.N., Hwang, K., Luna, B., 2013. The nuisance of nuisance regression: spectral misspecification in a common approach to resting-state fMRI preprocessing reintroduces noise and obscures functional connectivity. Neuroimage 82, 208-225.

Hartwig, A., Engstron, M., Flodmark, O., Invgar, M., Skare, S., 2011. A simple method to reduce signal fluctuations in fMRI caused by the interaction between motion and coil sensitivities. Proceedings of the International Society for Magnetic Resonance in Medicine, Montreal.

He, H., Liu, T.T., A geometric view of global signal confounds in resting-state functional MRI. Neuroimage 59, 2339-2348.

Herbst, M., Maclaren, J., Lovell-Smith, C., Sostheim, R., Egger, K., Harloff, A., Korvink, J., Hennig, J., Zaitsev, M., Reproduction of motion artifacts for performance analysis of prospective motion correction in MRI. Magn Reson Med 71, 182-190.

http://www.fil.ion.ucl.ac.uk/spm, W.D.o.C.N., SPM99.

Jenkinson, M., Bannister, P., Brady, M., Smith, S., 2002. Improved optimization for the robust and accurate linear registration and motion correction of brain images. Neuroimage 17, 825-841.

Jezzard, P., Clare, S., 1999. Sources of distortion in functional MRI data. Hum Brain Mapp 8, 80-85.

Jo. H.J., Saad, Z.S., Simmons, W.K., Milbury, L.A., Cox, R.W., Mapping sources of correlation in resting state FMRI, with artifact detection and removal. Neuroimage 52, 571-582.

Johnstone, T., Ores Walsh, K.S., Greischar, L.L., Alexander, A.L., Fox, A.S., Davidson, R.J., Oakes, T.R., 2006. Motion correction and the use of motion covariates in multiple-subject fMRI analysis. Hum Brain Mapp 27, 779-788.

Kim, B., Boes, J.L., Bland, P.H., Chenevert, T.L., Meyer, C.R., 1999. Motion correction in fMRI via registration of individual slices into an anatomical volume. Magn Reson Med 41, 964-972.

Leung, G., Plewes, D.B., 2005. Retrospective motion compensation using variable-density spiral trajectories. J Magn Reson Imaging 22, 373-380.

Lund, T.E., Norgaard, M.D., Rostrup, E., Rowe, J.B., Paulson, O.B., 2005. Motion or activity: their role in intra- and inter-subject variation in fMRI. Neuroimage 26, 960-964.

Maclaren, J., Armstrong, B.S., Barrows, R.T., Danishad, K.A., Ernst, T., Foster, C.L., Gumus, K., Herbst, M., Kadashevich, I.Y., Kusik, T.P., Li, Q., Lovell-Smith, C., Prieto, T., Schulze, P., Speck, O., Stucht, D., Zaitsev, M., 2012. Measurement and correction of microscopic head motion during magnetic resonance imaging of the brain. PLoS One 7, e48088.

Morgan, V.L., Dawant, B.M., Li, Y., Pickens, D.R., 2007. Comparison of fMRI statistical software packages and strategies for analysis

(56) References Cited

OTHER PUBLICATIONS of images containing random and stimulus-correlated motion. Comput Med Imaging Graph 31, 436-446.

Morgan, V.L., Pickens, D.R., Hartmann, S.L., Price, R.R., 2001. Comparison of functional MRI image realignment tools using a computer-generated phantom. Magn Reson Med 46, 510-514.

Muresan, L., Renken, R., Roerdink, J.B., Duifhuis, H., 2005. Automated correction of spin-history related motion artefacts in fMRI: simulated and phantom data. IEEE Trans Biomed Eng 52, 1450-1460.

Murphy, K., Birn, R.M., Handwerker, D.A., Jones, T.B., Bandettini, P.A., 2009. The impact of global signal regression on resting state correlations: are anti-correlated networks introduced? Neuroimage 44, 893-905.

Oakes, T.R., Johnstone, T., Ores Walsh, K.S., Greischar, L.L., Alexander, A.L., Fox, A.S., Davidson, R,J., 2005, Comparison of fMRI motion correction software tools. Neuroimage 23, 529-543.

Ooi, M.B., Krueger, S., Thomas, W,J., Swaminathan, S.V., Brown, T.R., 2009. Prospective real-time correction for arbitrary head motion using active markers. Magn Reson Med 62, 943-954.

Ooi, M,B., Muraskin, J., Zou, X., Thomas, W.J., Krueger, S., Aksoy, M., Bammer, R., Brown, T.R., 2013. Combined prospective and retrospective correction to reduce motion-induced image misalignment and geometric distortions in EPI. Magn Reson Med 69, 303-811.

Pandey, K.K., 2009. Mitigation of Motion Artifacts in Functional MRI: A Combined Acquisition, Reconstruction and Post Processing Approach, Biomedical Engineering. University of Michigan, Ann Arbor, p. 127.

Pfeuffer, J., Van de Moortele, P.F., Ugurbil, K., Hu, X., Glover, G.H., 2002. Correction of physiologically induced global off-resonance effects in dynamic echo-planar and spiral functional imaging. Magn Reson Med 47, 344-353.

Power, J.D., Barnes, K.A., Snyder, A.Z., Schlaggar, B.L., Petersen, S.E., 2011. Spurious but systematic correlations in functional connectivity MRI networks arise from subject motion. Neuroimage 59, 2142-2154.

Power, J.D., Mitra, A., Laumann, T.O., Snyder, A.Z., Schlaggar, B.L., Petersen, S.E., Methods to detect, characterize, and remove motion artifact in resting state fMRI. Neuroimage 84C, 320-341.

Qin, L., van Gelderen, P., Derbyshire, J.A., Jin, F., Lee, J., de Zwart, J.A., Tao, Y., Duyn, J.H., 2009. Prospective head-movement correction for high-resolution MRI using an in-bore optical tracking system. Magn Reson Med 62, 924-934.

Raj, D., Paley, D.P., Anderson, A.W., Kennan, R.P., Gore, J.C., 2000. A model for susceptibility artefacts from respiration in functional echo-planar magnetic resonance imaging. Phys Med Biol 45, 3809-3820.

Saad, Z.S., Gotts, S.J., Murphy, K., Chen, G., Jo, H.J., Martin, A., Cox, R.W., Trouble at rest: how correlation patterns and group differences become distorted after global signal regression. Brain Connect 2, 25-32.

Satterthwaite, T.D., Wolf, D.H., Loughead, J., Ruparel, K., Elliott, M.A., Hakonarson, H., Gur R.C., Gur, R.E., Impact of in-scanner head motion on multiple measures of functional connectivity: relevance for studies of neurodevelopment in youth. Neuroimage 60, 623-632.

MOTION CORRECTED IMAGING SYSTEM

RELATED APPLICATIONS

This application claims priority from U.S. Patent Application Ser. No. 62/158,017, filed 7 May 2015, which is incorporated herein in its entirety.

TECHNICAL FIELD

This invention relates to medical systems, and more particularly, to a motion corrected imaging system.

BACKGROUND

Magnetic resonance imaging (MRI) is a medical imaging technique used in radiology to visualize detailed internal structures. MRI makes use of the property of nuclear magnetic resonance to image nuclei of atoms inside the body. An MRI machine uses a powerful magnetic field to align the magnetization of some atoms in the body, and radio frequency fields to systematically alter the alignment of this magnetization. This causes the nuclei to produce a rotating magnetic field detectable by the scanner, which can be detected and used to construct an image of the scanned area of the body. Strong magnetic field gradients cause nuclei at different locations to rotate at different speeds, and thus three-dimensional spatial information can be obtained by providing gradients in each direction.

MRI can be used to capture a sequence of three-dimensional images acquired over time, for example, to review the response of a given part of the body, such as the brain, to an applied stimulus. In a common embodiment of this form of MRI, the image contrast can be made sensitive to blood oxygenation, and is typically used to image brain tissue. This is most often called blood oxygenation level dependent (BOLD) contrast, and is used for identifying brain regions that are functionally relevant for particular tasks or are functionally related by similar contrast changes (functional MRI). Functional MRI involves the acquisition of a sequence of three-dimensional volumes of images.

In typical practice, the acquisition of several to hundreds of volumes takes place over several minutes, each volume being acquired over a few seconds, resulting in a time series of three-dimensional volumes. Each volume acquisition is most commonly acquired as a stack of two-dimensional slices of images, with each two-dimensional image or images being acquired in 50-200 milliseconds, and with a time delay between some or all of the slices, such that one slice may be acquired near the beginning of the volume acquisition while another slice may be acquired near the end of the volume acquisition. In typical practice, the slices are acquired at time delays that are linearly spaced within the volume acquisition. During the data acquisition, it is possible and in fact very common that the head and brain will move to a different position and orientation. The effect of motion on BOLD signal level is complex and will result in signal changes that are due to the motion and not due to changes in BOLD contrast. These are termed motion artifact signals and the presence of more than only a few hundred microns of motion can result in corrupted data.

SUMMARY OF THE INVENTION

In accordance with an aspect of the present invention, a method is provided for detecting motion in an imaging system. A time series of volumetric images of a region of interest are captured at the imaging system. Each volumetric image of the time series of volumetric images is captured as a series of two-dimensional slices of the region of interest. A representative value is calculated for each voxel of the series of two-dimensional slices to create a representative volumetric dataset representing the region of interest. For each slice of the series of two-dimensional slices, a simulated volumetric time series is generated, including time series data for the slice and the calculated representative value at all times for the other slices of the series of two-dimensional slices. A volumetric registration is performed on each of the simulated volumetric time series to provide a set of estimated motion parameters for the slice associated with the simulated volumetric time series.

In accordance with another aspect of the present invention, a magnetic resonance imaging (MRI) system is provided. A magnetic resonance imaging scanner is configured to capture a time series of volumetric images of a region of interest at the imaging system. Each volumetric image of the time series of volumetric images is captured as a series of two-dimensional slices of the region of interest. A system control includes a processor and a non-transitory computer readable medium storing instructions executable by the processor. The instructions include a volume simulator configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices. A slice-to-volume registration component is configured to perform a volumetric registration on each of the simulated volumetric time series to provide a set of estimated motion parameters for the slice associated with the simulated volumetric time series. A correction component is configured to determine, for each of a plurality of voxels in the region of interest, a time series of voxel motion parameters from the set of estimated motion parameters associated with the slice of the series of two-dimensional slices to which the voxel belongs and the position of the voxel within the series of two-dimensional slices, perform a regression analysis on each time series of voxel signal values using an appropriate parameterization of the motion parameters, determined for the plurality of voxels in the region of interest, to provide a regression model representing the time series, and subtract a set of values generated from the regression model from the time series of volumetric images to provide a set of residual values representing a set of motion corrected volumetric images.

In accordance with yet another aspect of the present invention, a magnetic resonance imaging scanner is configured to capture a time series of volumetric images of a region of interest at the imaging system. Each volumetric image of the time series of volumetric images is captured as a series of two-dimensional slices of the region of interest. A system control includes a processor and a non-transitory computer readable medium storing instructions executable by the processor. The instructions include a volume simulator configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices. A slice-to-volume registration component is configured to perform a volumetric registration on each of the simulated volumetric time series to provide a set of estimated motion parameters for the slice associated with the simulated volumetric time series. The set of estimated motion parameters include a first time series representing rotation around a first axis within a plane of the slice, a second time series representing rotation around second axis within a plane of the slice and perpendicular to the first axis, and a third time series representing a translation along a third axis normal to the plane of the slice. A slicewise normalization component is configured to calculate a first measure of variation for the first time series, calculate a second measure of variation for the second time series, calculate a third measure of variation for the third time series, divide each value in the first time series by the first measure of deviation to provide a first normalized time series, divide each value in the second time series by the second measure of deviation to provide a second normalized time series, and divide each value in the third time series by the third measure of deviation to provide a third normalized time series.

DETAILED DESCRIPTION

Figure 1:
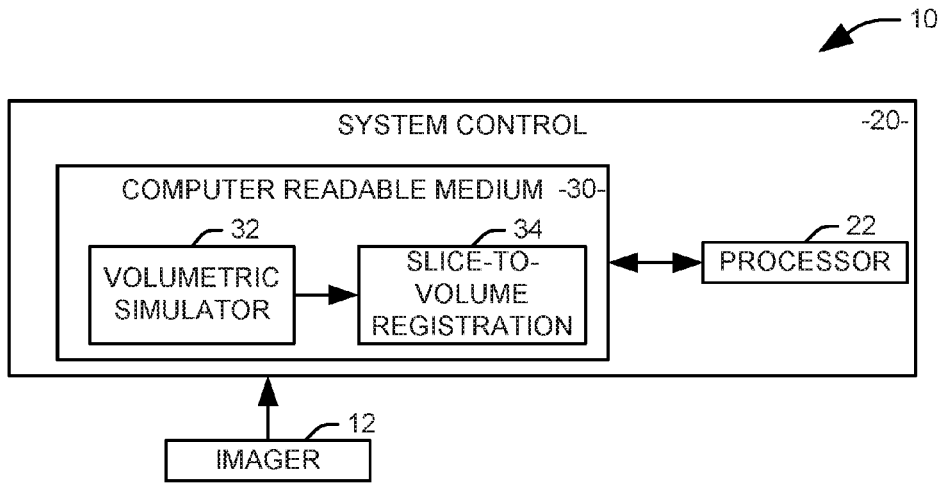
FIG. 1 illustrates one example of an imaging system in accordance with an aspect of the present invention.

As of this date, there is no effective solution to either reliably identify motion corruption events or account for the motion-related signal artifact from the data. Existing methods assume motion is synchronized to the volume acquisition because in the past, no algorithm existed to obtain the motion of the individual two-dimensional slices within the three-dimensional volume. Existing methods to obtain motion of an object consist of resampling the three-dimensional grid of data acquired at each volume such that the resampled data best matches a template three-dimensional grid containing images of said object. In existing methods, this resampling is a rigid-body transformation with six degrees of freedom (DOF), corresponding to x-axis, y-axis and z-axis translation and x-axis, y-axis and z-axis rotation. These six DOF fully describe changes in position and orientation that are physically possible for objects that do not undergo any spatial changes in structure.

The inventors have determined a method to obtain these slice motions, where this method is to be used with data acquired using a three-dimensional imaging device such as, but not limited to, an MRI scanner or a positron emission tomography (PET) scanner or a computed tomography (CT) scanner. This invention can be used to obtain the motion of the individual two-dimensional slices within the three-dimensional volume, specifically the six degree of freedom motion parameters for a sequence of individual two-dimensional slices within a sequence of three-dimensional imaging volumes or stack of slices.

If the sequences of motion of the two-dimensional slices are known, it is possible to model the motion-related signal changes using these motion parameters. In typical BOLD-weighted MRI data acquired as a stack of two-dimensional slices, any relative motion between the object and image sampling grid will result in signal artifact from several different physical sources. One such source is the change in partial volume of the sampling grid from volume to volume for a particular slice. The partial volume artifact arises from a shifted sampling grid such that a given plurality of tissues sampled at one time point in one volume voxel (voxel) is sampled differently in space at a later time such that said voxel samples a different plurality of tissue at this later time, giving rise to a signal change that is proportional to the resampled underlying signal intensity of those tissues under this changed sampling grid. This artifact can be ameliorated by resampling the sampling grid retrospectively (after data acquisition) such that the sampling grid remains at a given spatial location and orientation rather than moving with the relative motion between object and sampling grid.

A different source of artifact is spin history artifact. This is a nonlinear effect of changing the data acquisition grid prior to spin excitation, and arises because the timing of spin excitations is disrupted. This and other nonlinear signal changes that arise due to motion, such as image warping signal changes due to motion and receive & transmit field contrast changes due to motion, can be modeled using an effective parameterization of the motion vectors. The inventors have determined that it is useful to incorporate adjacent slice motion in the parameterization. The adjacent slice motion is a used because motion of a slice into the plane of the adjacent slice will affect subsequent signal level obtained from that adjacent slice. Therefore, in one implementation, the regression model includes adjacent slice motion as one of the covariates.

If the sequences of motion of the two-dimensional slices within the three-dimensional volumes of data are known, the inventors have determined that it is possible to characterize the motion with a metric that is sensitive to the expected level of corruption or sensitive to the presence of corruption in the data. An ideal characterization of motion corruption has a one-to-one correspondence between the metric and the effect on the resulting image data analysis, but there is unlikely to be any one solution that fits all of them while maximizing sensitivity and specificity. In one embodiment, the average voxel displacement can be computed across the object by applying a trigonometric conversion to the slice's six degree of freedom motion parameters, and averaging the resulting sum of squares of the voxel translation at each voxel at corners of a cube approximately the size of the object of interest, such as the brain. This metric is sensitive to motion at the slice level and to the resulting BOLD sensitivity reduction.

Accordingly, systems and method are provided for obtaining the position and orientation of parts of images of an object within three-dimensional volume of images of the object with respect to a reference three-dimensional volume of images of the object. For example, where a three-dimensional volume of images are acquired using a magnetic resonance imaging (MRI) device, the position and orientation of the object may change during the course of acquiring said volume of images, as the series of three-dimensional volumes of images may be acquired over time. One implementation of the algorithm uses two stages of coregistration. First, a three degree of freedom resampling correction to a template is performed. This is a rigid-body resampling, with the possible resampling grid is restricted to motion within the plane of the slice acquisition (in-plane). Motion within the plane of a two-dimensional slice acquisition consists of the two translations within the plane and a rotation about the axis perpendicular to the plane. This represents a slicewise, in-plane motion correction. This process only corrects for partial volume effects within the plane of slice acquisition.

Next, the in-plane corrected data are passed to a volumetric registration, but this is done separately for each slice to produce out-of-plane motion parameters that are sufficient for capturing the temporal variance. The three degrees of freedom representing out-of-plane motion parameters consist of translation along the axis perpendicular to the slice plane and rotations about the two axes comprising the plane. The out-of-plane motion estimates can be normalized in variance to match the variance of in-plane parameters.

The invention reduced to practice, but not limited to, consists of the creation of a regression matrix specific to each voxel, which is then regressed against the signal changes and can be removed using subtraction or used as regressors of no interest. The regression matrix for a given voxel within a given slice is created by first converting the 6 DOF motion parameters of that given slice to the 3 DOF translational motion (e.g. x-, y- and z-translation) of that given voxel. These individual voxel translations are used to construct the regression matrix. In the implementation reduced to practice, but not limited to, the matrix is composed of 12 covariates: the 3 Cartesian translation vectors (x-, y- and z-translation), their squares, their lagged-by-one representations and the motion of the voxels in the adjacent slices into the slice of interest.

FIG. 1 illustrates one example of an imaging system 10 in accordance with an aspect of the present invention. The imaging system 10 includes an imager 12 configured to capture a time series of volumetric images of a region of interest at the imaging system. Accordingly, the values of each voxel within the volume are represented as a time series of values, such as intensity or attenuation values, such that the time series of volumetric images are essentially four-dimensional, with the time-series representing voxels across the three spatial dimensional of the volume across time. Each volumetric image of the time series of volumetric images is captured as a series of two-dimensional slices of the region of interest. The positions of the two-dimensional slices are consistent, absent motion, across the entire time series, so each of the two-dimensional slices can be represented as its own three-dimensional time series that is a proper subset of the time series of volumetric images, with the time-series representing voxels across the two spatial dimensional of the slice across time. The imager 12 can be any appropriate imaging system for capturing such a time series, including a magnetic resonance imaging (MRI) scanner, a positron emission tomography (PET) scanner, or a computed tomography (CT) scanner. In one implementation, the imager 12 can be an MRI scanner utilized in functional MRI arrangement.

A system control 20 processes the captured imaging data to recognize motion error within the data. To this end, the system control 20 includes a processor 22 and a non-transitory computer readable medium 30 storing instructions executable by the processor to perform the motion correction. A volume simulator 32 is configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices. Essentially, each two-dimensional slice is represented by its own simulated volumetric time series in which only the time series associated with the two-dimensional slice is dynamic, with each other voxel in the volume, that is, the voxels associated with the other two-dimensional slices, represented as a constant value, the representative value for the voxel, across the entire time series. The representative value can include, for example, any of an average value (e.g., mean, median, or mode) across the volume acquisition, an average value across a subset of the volume acquisition, an initial value, a final value, or a value associated with a specific series of acquired slices.

The simulated volumetric datasets are then provided to a slice-to-volume registration component 34 configured to perform a volumetric registration on each of the simulated volumetric time series to provide a set of estimated motion parameters for the slice associated with the simulated volumetric time series. For example, the estimated motion parameters can include a time series representing the motion of each voxel within the slice across the volume acquisition. In one implementation, the slice-to-volume registration component 34 can utilize the volumetric registration only to determine motion parameters for motion out of the plane of the slice, that is, translations along an axis normal to the plane of the slice and rotations around axes within the plane of the slice. In this implementation, in-plane motion can be identified by coregistering each slice at each time to a set of representative values for the slice to provide motion parameters for translation within the plane of the slice and rotation around the axis normal to the plane of the slice. The representative value can include, for example, any of an average value (e.g., mean, median, or mode) across the volume acquisition, an average value across a subset of the volume acquisition, an initial value, a final value, or a value associated with a specific series of acquired slices.

The set of estimated motion parameters for the out-of-plane motion is sufficient to indicate the direction of motion, but may not correctly identify the amplitude of the motion. Accordingly, the inventors have determined that the estimated motion parameters for each slice can be used to correct the motion via a regression analysis on a data set derived from the estimated motion parameters to provide a regression model representing the time series and subtract a set of values generated from the regression model from the time series of volumetric images to provide a set of residual values representing a set of motion corrected volumetric data. Alternatively, information about the motion of the entire volume, as well as a measure of deviation for each time series, can be used to normalize the time series of motion data to appropriate amplitude values.

Figure 2:
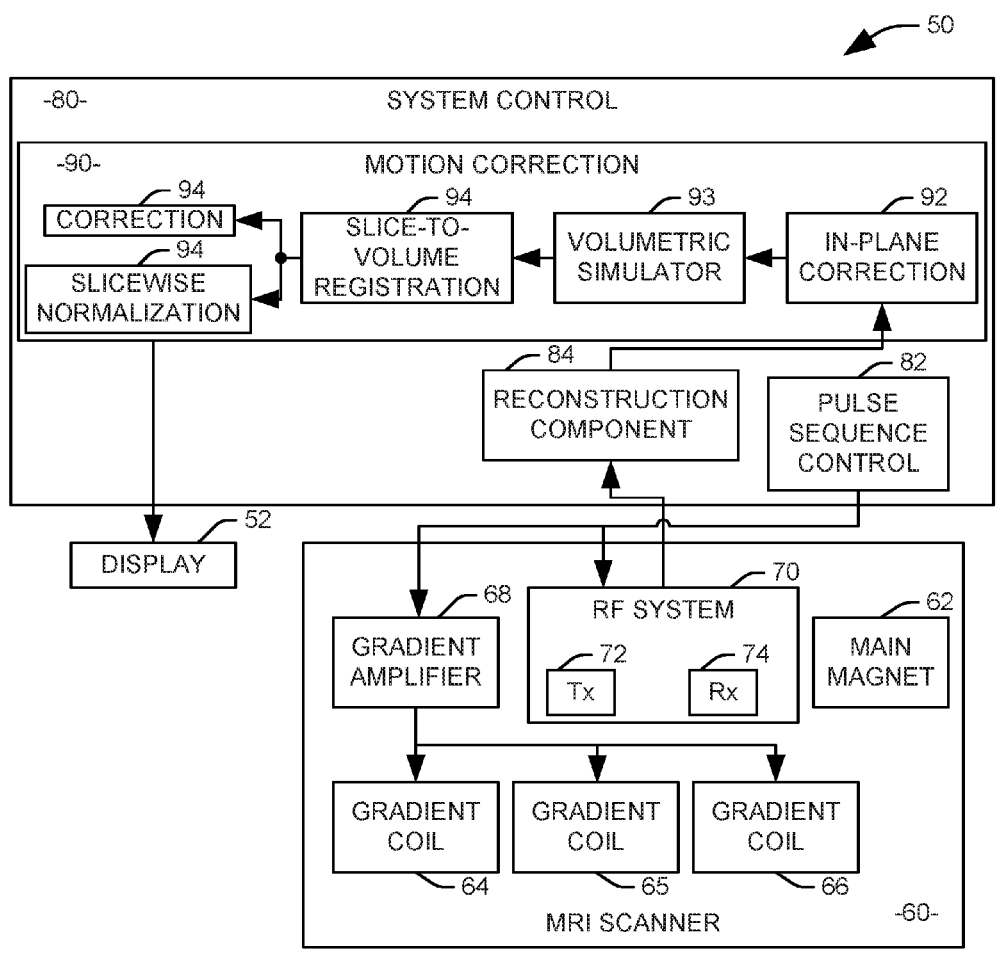
FIG. 2 illustrates an example of an MRI imaging system in accordance with an aspect of the present invention.

FIG. 2 illustrates an example of an MRI imaging system 50 in accordance with an aspect of the present invention. The imaging system 50 includes a display 52, a magnetic resonance imaging (MRI) scanner 60, and a system control 80. The MRI scanner 60 includes a main magnet 62, three orthogonal gradient coils 64-66, and a radio frequency (RF) system 70. The main magnet 62 is designed to provide a constant, homogeneous magnetic field. The orthogonal gradient coils 64-66 are designed to provide three orthogonal, controllable magnetic gradients used to acquire image data of a desired slice by generating an encoded and slice-selective magnetic field. To this end, the gradient coils 64-66 are arranged to establish a gradient field for implementing MRI imaging based on the current provided by the gradient amplifier 68. The gradient coils 64-66 can be formed of a set of gradient coils along transverse axes, referred to herein as the readout axis, the phase encoding axis, and the slice selection axis. The field produced along each axis can be controlled via current applied to each gradient coil 64-66 by the gradient amplifier 68.

The RF system 70 can include an RF transmit coil 72 and an RF receive coil 74 designed to transmit RF pulses and receive image data representing the region of interest It will be appreciated, however, that an integrated transceiver coil (not shown) can be used in place of transmit coil 72 and receive coil 74. The RF system 70 can generate an oscillating magnetic field via application of RF current to the RF transmit coil 72. The RF transmit coil 72, for example, can apply RF pulses to the region of interest according to the applied electrical current. The RF receive coil 74 can convert a processing magnetism at the region of interest to electrical signals, which are provided to the system control 80.

The system control 80 can be implemented as dedicated hardware, software stored on a non-transitory computer readable medium and executed by a general purpose processor, or a combination of both. The system control 80 includes a sequence control 82 that is configured to control the gradient coils 64-66 and the RF system 70. For example, the sequence control 82 can provide control signals to a gradient amplifier 68 that supplies variable current to each of the orthogonal gradient coils 64-66 as well as the current supplied to the RF transmit coil 72. The system control 80 further comprises an image reconstruction component 84 that is configured to construct an image based on the data acquired from the RF system 80. Each of the constructed image and the data from which it was constructed can be stored at the system control 80. In the illustrated implementation, the system control 80 can be configured to control the gradient coils 64-66 and the RF system 70 as to capture a time series of volumetric images of a region of interest at the imaging system, for example, for use as a functional MRI image. Each volumetric image of the time series of volumetric images is captured as a series of two-dimensional slices of the region of interest.

The system control 80 can further include a motion correction component 90 configured to correct the captured volumetric images for motion during acquisition. The volumetric images are provided to an in-plane correction component 92 configured to apply an initial, in-plane motion correction to the time series of images. Specifically, the in-plane correction component 92 applies an initial, volumetric motion correction to the captured time series of volumetric images by coregistering each of the series of three-dimensional volumes to a representative set of volumetric data, to provide for each of the series of three-dimensional volumes, a set of motion corrected data. The representative set of volumetric data can include for each voxel, for example, any of an average value (e.g., mean, median, or mode) across the volume acquisition, an average value across a subset of the volume acquisition, an initial value, a final value, or a value associated with a specific volumetric image.

It will be appreciated that this motion correction component corrects only for motion within the plane of the slices, specifically partial volume effects within the plane of slice acquisition. It does, however, provide useful motion data along three degrees of freedom. Specifically, the in-plane correction component 92 provides a first time series representing translation along a first axis within a plane of slice acquisition, a second time series representing translation along a second axis within a plane of the slice and perpendicular to the first axis, and a third time series representing a rotation around a third axis normal to the plane of the slice. Accordingly, in one embodiment, these time series can be retained and used for correction of the volumetric images.

In the illustrated implementation, detection of motion outside of the plane of slice acquisition can be performed at a volume simulator 93 and a slice-to-volume registration component 94. The volume simulator 93 is configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices. Accordingly, each two-dimensional slice is represented by its own simulated volumetric time series in which only the time series associated with the two-dimensional slice is dynamic, with each other voxel in the volume, that is, the voxels associated with the other two-dimensional slices, represented as a constant value, the representative value for the voxel, across the entire time series. The representative value can include, for example, any of an average value (e.g., mean, median, or mode) across the volume acquisition, an average value across a subset of the volume acquisition, an initial value, a final value, or a value associated with a specific series of acquired slices.

A slice-to-volume registration component 94 is configured to perform a volumetric registration on each of the simulated volumetric time series to provide a set of estimated motion parameters for the slice associated with the simulated volumetric time series. In the illustrated implementation, the estimated motion parameters can include a fourth time series representing rotation around the first axis, a fifth time series representing rotation around the second axis, and a sixth time series representing a translation along the third axis. The estimated motion parameters for the out-of-plane motion are sufficient to indicate the direction of motion, but may not correctly identify the amplitude of the motion. Accordingly, these values can be provided to one or both of a correction component 96 and a slicewise normalization component 98.

The correction component 96 is configured to determine, for each of a plurality of voxels in the region of interest, a time series of motion parameters from the set of estimated motion parameters associated with the slice of the series of two-dimensional slices to which the voxel belongs and the position of the voxel within the series of two-dimensional slices. Accordingly, each voxel can be represented as respective time series of translations among first, second, and third axes. The correction component 96 performs a regression analysis on each time series of motion parameters to provide a regression model representing the time series. The regression can be performed, for each voxel, over any of a number of regressors, including translations in three dimensions, squared values for the translations, values for voxels adjacent to the voxel, and delayed values (e.g., by one capture interval in the time series) for the translations of the voxel or adjacent voxels. In another implementation, simulated spin history and partial volume signals are generated from the set of estimated motion parameters to determine a simulated signal level change over time for each voxel due to motion artifact arising from spin history and partial volume effects, and this signal is used as part of the regression. Once the model is established, a set of values generated from the regression model is subtracted from the time series of volumetric images to provide a set of residual values representing a set of motion corrected parameters.

The slicewise normalization component 98 normalizes the estimated motion parameters according to a calculated measure of variation, such as a standard deviation, variance, or interquartile range, to correct the amplitudes to meaningful values. Accordingly, measures of variation for the each time series, and each value of the time series can be divided by the measure of variation. Alternatively or additionally, a total detected motion can be determined for the volume itself, as well as for the in-plane motion parameters, for which accurate amplitudes are available. A scaling factor for the out-of-plane parameters can be determined such that an average of the motion across the slices for each degree of freedom is equal to the motion for the entire volume.

Figure 3:
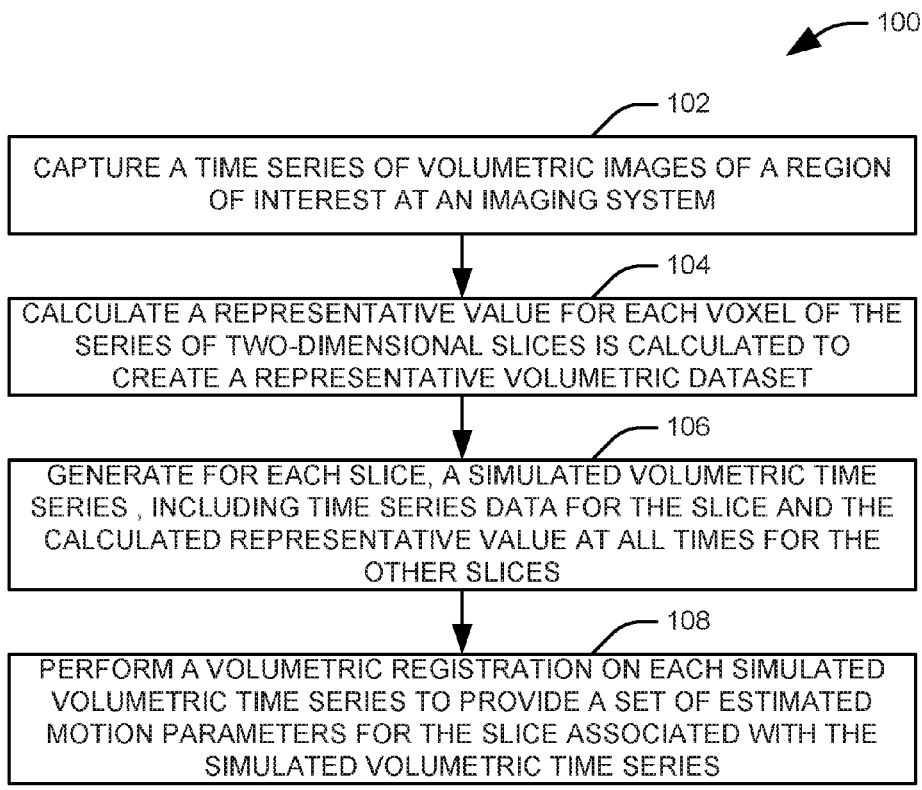
FIG. 3 illustrates method for detecting motion in an imaging system.
Figure 4:
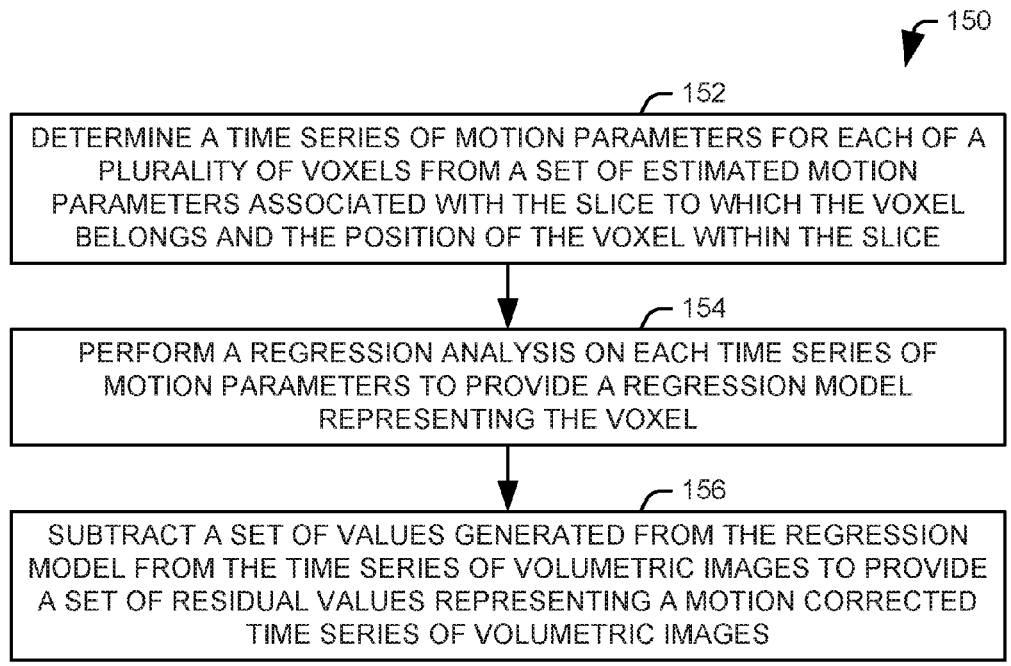
FIG. 4 illustrates a method for applying motion correction to a time series of volumetric images from a set of estimated motion data, such as that generated in FIG. 3.
Figure 5:
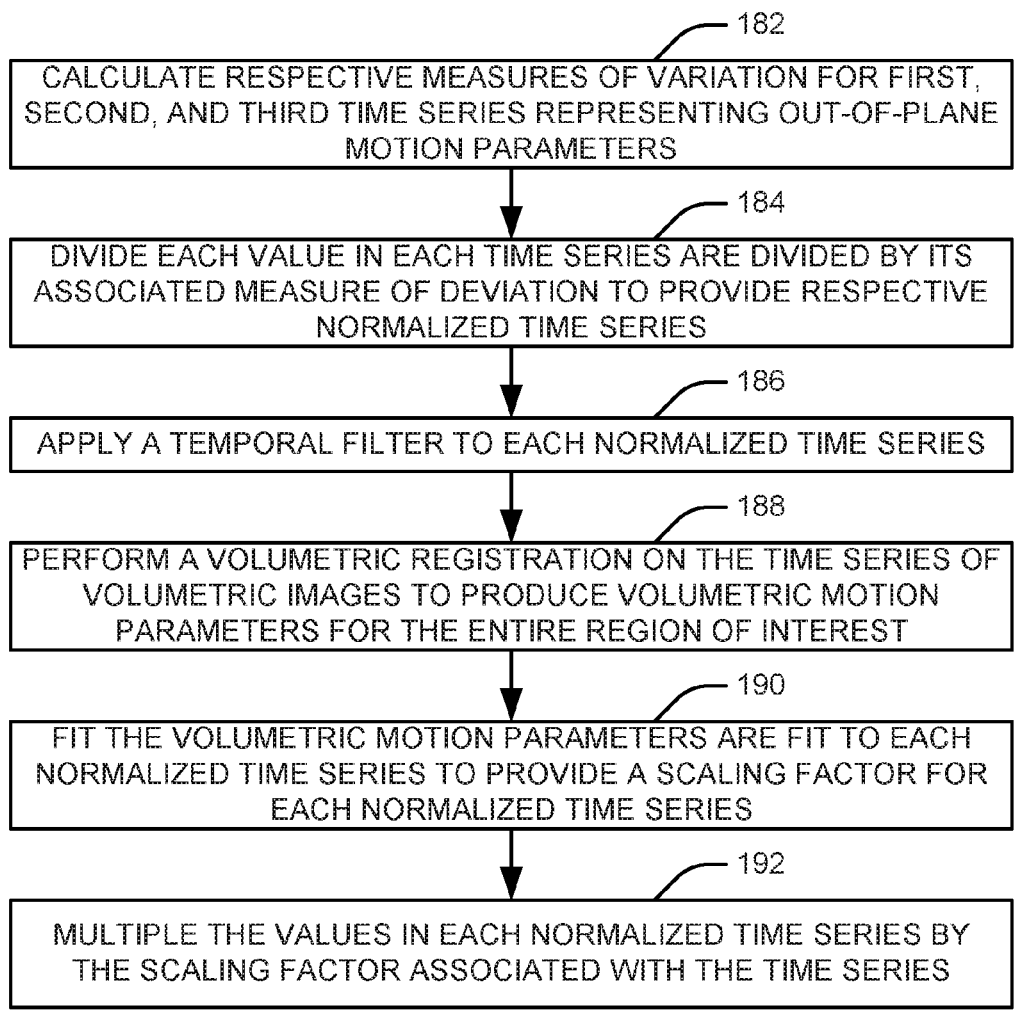
FIG. 5 illustrates a method for characterizing motion in a time series of volumetric images from a set of estimated motion data, such as that generated in FIG. 3.

In view of the foregoing structural and functional features described above in FIGS. 1 and 2, example methodologies will be better appreciated with reference to FIGS. 3-5. While, for purposes of simplicity of explanation, the methodologies of FIGS. 3-5 are shown and described as executing serially, it is to be understood and appreciated that the present invention is not limited by the illustrated order, as some actions could in other examples occur in different orders and/or concurrently from that shown and described herein.

FIG. 3 illustrates method 100 for detecting motion in an imaging system. At 102, a time series of volumetric images of a region of interest are captured at the imaging system. Each volumetric image of the time series of volumetric images is captured as a series of two-dimensional slices of the region of interest. At 104, a representative value for each voxel of the series of two-dimensional slices is calculated to create a representative volumetric dataset representing the region of interest. The representative set of volumetric data can include for each voxel, for example, any of an average value (e.g., mean, median, or mode) across the volume acquisition, an average value across a subset of the volume acquisition, an initial value, a final value, or a value associated with a specific volumetric image.

At 106, for each slice of the series of two-dimensional slices, a simulated volumetric time series is generated, including time series data for the slice and the calculated representative value at all times for the other slices of the series of two-dimensional slices. At 108, a volumetric registration is performed on each of the simulated volumetric time series to provide a set of estimated motion parameters for the slice associated with the simulated volumetric time series. Specifically, the estimated motion parameters determined via the volumetric registration can represent a direction of motion at each two-dimensional slice through the time series. In one implementation, the volumetric registration at 108 can be used solely to account for motion out of a plane of slice acquisition, such that the estimated motion parameters include three time series, representing translation along an axis normal to the plane of slice acquisition and rotation along each of the two axes parallel to the plane of slice acquisition. In this implementation, data for the remaining degrees of freedom are obtained from an in-plane correction, via a volumetric registration, on the captured time series of volumetric imaged prior to the calculation of representative values and the creation of the simulated volumetric time series at 104 and 106.

FIG. 4 illustrates a method 150 for applying motion correction to a time series of volumetric images from a set of estimated motion data, such as that generated in FIG. 3. The set of estimated motion parameters for the out-of-plane motion is sufficient to indicate the direction of motion, but may not correctly identify the amplitude of the motion. The method of FIG. 4 determines a motion corrected time series of volumetric images from these estimated motion parameters. At 152, a time series of motion parameters is determined for each of a plurality of voxels in the region of interest from the set of estimated motion parameters associated with the slice of the series of two-dimensional slices to which the voxel belongs and the position of the voxel within the slice. Essentially, the estimated motion parameters include six degrees of motions for each of the plurality of slices, but it will be appreciated that rotation at a given slice will translate different voxels within the slice differently. Accordingly, individual translations in three-dimensions can be determined as a time series for each voxel from the known translations and rotations of the slice and the position of the voxel relative to an origin of the rotation. So in one implementation, each pixel is represented by three time series, representing translations along each of three mutually orthogonal axes.

At 154, a regression analysis is performed on each time series of motion parameters, determined for the plurality of voxels in the region of interest, to provide a regression model representing the time series. The results of the regression analysis represent the actual motion of the pixel across the acquisition of the time series of volumetric images. Accordingly, at 156 the set of values generated from the regression model is subtracted from the time series of volumetric images to provide a set of residual values representing a motion corrected time series of volumetric images.

The regression model for each voxel can utilize any of a number of regressions to model the pixel motion. In one implementation, the regressors include a a first translation along a first axis, a second translation along a second axis, perpendicular to the first axis, and a translation along a third axis, perpendicular to each of the first and second axes, squared values of each of the first, second, and third translations. Additionally or alternatively, the regression analysis can also utilize at least one time series representing a motion parameter associated with an adjacent voxel, such as a translation along one or more of the three axes. The adjacent voxel can be associated with an adjacent voxel in a slice adjacent to the slice to which the voxel belongs. In another implementation, the regressors can include a delayed transformation of the first, second, or third translation that is delayed by one interval in the time series of motion parameters for the voxel, or a similar delayed transformation of the adjacent voxel translations, as well as squared values for the delayed translations.

In another implementation, a more detailed, physics-based model of motion artifact can be constructed using the estimated slice motion parameters, the timing of the radiofrequency (RF) excitation pulses for each slice, the flip angle profile across the slice of a slice excitation pulse, a three-dimensional volume of the average magnetization signal level within each voxel, and a three-dimensional volume containing the tissue longitudinal relaxation constants within each voxel. Using this information and subsampling each voxel through the slice, or in the axis perpendicular to the plane of the slice, generates a stack of subslices, that is, a slice within the voxel, taken in the same plane as the slice plane, each with its own T1 constant and steady-state magnetization signal level. For each subslice of a voxel, the time sequence of excitations and flip angle of said excitations is computed using the slice motion parameter describing the motion of said slice in the axis perpendicular to the plane of the slice. The derived excitation history, baseline magnetization and T1 values are passed into the Bloch equations for calculating the nuclear magnetization as a function of time.

During the slice RF excitation for two-dimensional slice acquisition in MRI, an RF pulse is amplified and directed over the transmit coil to excite water hydrogen protons within each slice to a desired level of transverse magnetization, also known as flip angle. During the RF excitation, a gradient coil is directed to apply a gradient of magnetization in the direction perpendicular to the plane of slice acquisition. The slice excitation pulse and this gradient are constructed such that the precession frequency of the spins within a desired slice are resonant with the RF excitation frequency, and thus only those spins within said desired slice become excited to a desired flip angle. However, the selection of spins is imperfect, giving rise to a profile of excitation flip angle that varies as a function of location across the axis perpendicular to the slice acquisition plane. The RF excitation is then repeated for at least one subsequent slice, which may or may not be located directly adjacent to the previous slice, until the full desired stack of two-dimensional slices have been acquired, and this process is then repeated for at least one subsequent volume in the same manner, for as many volumes as are desired.

The ideal acquisition of there-dimensional stack of two-dimensional slices results in an identical sequence of RF excitations across time for every spin within the volume, with a variation in flip angle varying across the axis perpendicular to the slice. However, in real data acquisition, there is always motion in the direction perpendicular to the slice axis, and this disrupts the time sequence and location of the slice profile with respect to the voxel. It is possible for a subslice portion of a voxel that is acquired at the first RF pulse to then move in the direction perpendicular to the slice plane such that its location is moved to the location where an adjacent slice had been at the time of the first RF pulse, and for a second RF pulse that had been intended to excite spins located at the adjacent slice to then unintentionally re-excite said subslice. It is further possible for said subslice to move in the opposite direction back through the original slice such that it is then located adjacent to the original location but on the other side from said second slice, such that a third RF pulse that had been intended to excite spins located at this second adjacent slice on the other side of the first adjacent slice, and thereby unintentionally excite the subslice a third time. The sequence of motion in the direction perpendicular to the slice plane is arbitrary and therefore, this results in a proliferation of excitations that are unique for subslices. Therefore, the computation of signal in the presence of motion utilizes a sampling grid based on simulating signal evolution for numerous smaller slices taken within each voxel, where each subslice is a slice of a voxel, taken in the same plane as the slice plane.

The physics-based model is used to compute both the simulated signal evolution, termed spin history simulation, and a simpler form of signal change based purely on the change in sampling grid and the presumed average magnetization of each voxel, termed partial volume simulation, for each subslice. The motion is then used to resample the simulated spin history and partial volume signals according to the voxel locations at each acquisition and thereby determine each voxel's simulated signal level change over time due to motion artifact arising from spin history and partial volume effects. These signals are used in the regression model to correct for the presence of these motion artifacts.

FIG. 5 illustrates a method 180 for characterizing motion in a time series of volumetric images from a set of estimated motion data, such as that generated in FIG. 3. In the illustrated method 180, the set of estimated motion parameters include a first time series representing rotation around a first axis within a plane of the slice, a second time series representing rotation around second axis within a plane of the slice and perpendicular to the first axis, and a third time series representing a translation along a third axis normal to the plane of the slice. At 182, respective measures of variation are calculated for the first, second, and third time series. At 184, each value in each of the first, second, and third time series are divided by the measure of deviation for the time series to provide respective normalized time series. At 186, a temporal filter is applied to each of the first normalized time series, the second normalized time series, and the third normalized time series.

At 188, a volumetric registration is performed on the time series of volumetric images of the region of interest to produce volumetric motion parameters for the entire region of interest. The motion parameters include at least a rotation of the volume around the first axis, a rotation of the volume around the second axis, and a translation along a third axis. At 190, the volumetric motion parameters are fit to the first, second, and third normalized time series to provide a scaling factor for each of the first, second, and third normalized time series. At 192, the values in each of the first, second, and third normalized time series are multiplied by the scaling factor associated with the time series.

Figure 6:
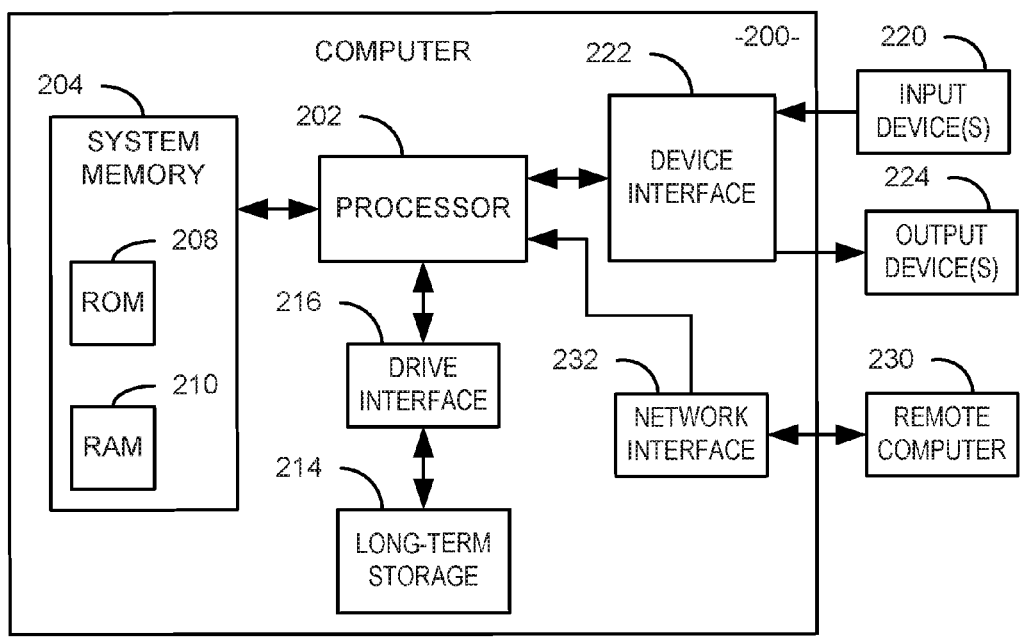
FIG. 6 is a schematic block diagram illustrating an exemplary system of hardware components capable of implementing examples of the systems and methods disclosed in FIGS. 1-5.

FIG. 6 is a schematic block diagram illustrating an exemplary system 200 of hardware components capable of implementing examples of the systems and methods disclosed in FIGS. 1-5, such as the system control 20 illustrated in FIG. 1. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a therapeutic delivery system in accordance with the present invention. Computer executable logic for implementing the diagnostic system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for detecting motion in an imaging system, the method comprising:
    capturing a time series of volumetric images of a region of interest at the imaging system, each volumetric image of the time series of volumetric images being captured as a series of two-dimensional slices of the region of interest;
    calculating a representative value for each voxel of the series of two-dimensional slices to create a representative volumetric dataset representing the region of interest;
    generating, for each slice of the series of two-dimensional slices, a simulated volumetric time series including time series data for the slice and the calculated representative value at all times for the other slices of the series of two-dimensional slices; and
    performing a volumetric registration on each of the simulated volumetric time series to provide a set of estimated motion parameters for the slice associated with the simulated volumetric time series.

2. The method of claim 1, further comprising:
    determining, for each of a plurality of voxels in the region of interest, a time series of translations from the set of estimated motion parameters associated with the slice of the series of two-dimensional slices to which the voxel belongs and the position of the voxel within the slice;
    performing a regression analysis on each time series of translations, determined for the plurality of voxels in the region of interest, to provide a regression model representing the time series; and
    subtracting a set of values generated from the regression model from the time series of volumetric images to provide a set of residual values representing a motion corrected time series of volumetric images.

3. The method of claim 2, wherein performing the regression analysis on the time series of translations for a given voxel comprises performing the regression analysis on the time series of translations for the voxel and at least one time series associated with an adjacent voxel.

4. The method of claim 3, wherein the at least one time series associated with an adjacent voxel is associated with an adjacent voxel in a slice adjacent to the slice to which the voxel belongs.

5. The method of claim 4, wherein performing the regression analysis on the time series of translations for a given voxel comprises performing the regression analysis on the time series of translations using a plurality of regressors comprising a first translation along a first axis, a second translation along a second axis, perpendicular to the first axis, and a translation along a third axis, perpendicular to each of the first and second axes, squared values of each of the first, second, and third translations, and an adjacent voxel value representing a translation along the first axis for the adjacent voxel.

6. The method of claim 2, wherein performing the regression analysis on the time series of translations for a given voxel comprises performing the regression analysis on the time series of translations using a plurality of regressors comprising a first translation along a first axis, a second translation along a second axis, perpendicular to the first axis, and a translation along a third axis, perpendicular to each of the first and second axes, squared values of each of the first, second, and third translations, a delayed transformation of the first translation that is delayed by one interval in the time series of translations for the voxel.

7. The method of claim 2, further comprising:
    resampling simulated spin history and partial volume signals according to the set of estimated motion parameters to determine a simulated signal level change over time for each voxel due to motion artifact arising from spin history and partial volume effects;
    wherein performing the regression analysis on the time series of translations for a given voxel comprises performing the regression analysis on the time series of translations using a plurality of regressors comprising the simulated signal level change.

8. The method of claim 1, further comprising applying an in-plane motion correction to the captured time series of volumetric images by coregistering each two-dimensional slice at each time to a set of representative values for the slice to provide motion parameters comprising, for each of the series of two-dimensional slices, a first time series representing translation along a first axis within a plane of the slice, a second time series representing translation along a second axis within a plane of the slice and perpendicular to the first axis, and a third time series representing a rotation around a third axis normal to the plane of the slice.

9. The method of claim 8, wherein the set of estimated motion parameters comprise a fourth time series representing rotation around the first axis, a fifth time series representing rotation around the second axis, and a sixth time series representing a translation along the third axis and the method further comprises:
    determining, for each of a plurality of voxels in the region of interest, a time series of motion parameters derived from the first time series for the slice of the series of two-dimensional slices to which the voxel belongs, the second time series for the slice of the series of two-dimensional slices to which the voxel belongs, the third time series for the slice of the series of two-dimensional slices to which the voxel belongs, the fourth time series for the slice of the series of two-dimensional slices to which the voxel belongs, the fifth time series for the slice of the series of two-dimensional slices to which the voxel belongs, and the sixth time series for the slice of the series of two-dimensional slices to which the voxel belongs, and the position of the voxel within the series of two-dimensional slices;

performing a regression analysis on each time series of motion parameters, determined for the plurality of voxels in the region of interest, to provide a regression model representing the time series; and subtracting a set of values generated from the regression model from the time series of volumetric images to provide a set of residual values representing a set of motion correction parameters.

10. The method of claim 1, further comprising:

applying an initial, volumetric motion correction to the captured time series of volumetric images by coregistering each of the series of three-dimensional volumes to a representative set of volumetric data, to provide for each of the series of three-dimensional volumes, a set of motion correction data; and applying the set of motion correction data to the captured time series of volumetric images before calculating a representative value for each voxel of the series of two-dimensional slices.

11. The method of claim 1, wherein the set of estimated motion parameters comprise a first time series representing rotation around a first axis within a plane of the slice, a second time series representing rotation around second axis within a plane of the slice and perpendicular to the first axis, and a third time series representing a translation along a third axis normal to the plane of the slice, the method further comprising:

calculating a first measure of variation for the first time series;

calculating a second measure of variation for the second time series;

calculating a third measure of variation for the third time series;

dividing each value in the first time series by the first measure of deviation to provide a first normalized time series;

dividing each value in the second time series by the second measure of deviation to provide a second normalized time series; and dividing each value in the third time series by the third measure of deviation to provide a third normalized time series.

12. The method of claim 11, further comprising:

performing a volumetric registration on the time series of volumetric images of the region of interest to produce volumetric motion parameters for the entire region of interest, the motion parameters including at least a rotation of the volume around the first axis, a rotation of the volume around the second axis, and a translation along a third axis;

fitting the volumetric motion parameters to the first, second, and third normalized time series to provide a scaling factor for each of the first, second, and third normalized time series; and multiplying the values in each of the first, second, and third normalized time series by its associated scaling factor.

13. The method of claim 12, further comprising applying a temporal filter to each of the first normalized time series, the second normalized time series, and the third normalized time series before the volumetric registration is performed.

14. A magnetic resonance imaging (MRI) system comprising:

a magnetic resonance imaging scanner configured to capture a time series of volumetric images of a region of interest at the imaging system, each volumetric image of the time series of volumetric images being captured as a series of two-dimensional slices of the region of interest; and a system control comprising a processor and a non-transitory computer readable medium storing instructions executable by the processor, the instructions comprising:

a volume simulator configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices;

a slice-to-volume registration component configured to perform a volumetric registration on each of the simulated volumetric time series to provide a set of estimated motion parameters for the slice associated with the simulated volumetric time series; and a correction component configured to determine, for each of a plurality of voxels in the region of interest, a time series of translations from the set of estimated motion parameters associated with the slice of the series of two-dimensional slices to which the voxel belongs and the position of the voxel within the series of two-dimensional slices, perform a regression analysis on each time series of translations, determined for the plurality of voxels in the region of interest, to provide a regression model representing the time series, and subtract a set of values generated from the regression model from the time series of volumetric images to provide a set of residual values representing a set of motion corrected parameters.

15. The MRI system of claim 14, wherein the set of estimated motion parameters comprise a first time series representing rotation around a first axis within a plane of the slice, a second time series representing rotation around second axis within a plane of the slice and perpendicular to the first axis, and a third time series representing a translation along a third axis normal to the plane of the slice, and the instructions further comprising a normalization component configured to calculate a first measure of variation for the first time series, calculate a second measure of variation for the second time series, calculate a third measure of variation for the third time series, divide each value in the first time series by the first measure of deviation to provide a first normalized time series, divide each value in the second time series by the second measure of deviation to provide a second normalized time series, and divide each value in the third time series by the third measure of deviation to provide a third normalized time series.

16. The MRI system of claim 15, the instructions further comprising an in-plane correction component configured to apply an initial, in-plane motion correction to the time series of images by coregistering each slice at each time to a set of representative values for the slice to provide, for each of the series of two-dimensional slices, a first time series representing translation along a first axis within a plane of the slice, a second time series representing translation along a second axis within a plane of the slice and perpendicular to the first axis, and a third time series representing a rotation around a third axis normal to the plane of the slice.

17. The MRI system of claim 15, the correction component being configured to perform the regression analysis on the time series of translations for the voxel and at least one time series associated with an adjacent voxel in a slice adjacent to the slice to which the voxel belongs.

18. A magnetic resonance imaging (MRI) system comprising:
- a magnetic resonance imaging scanner configured to capture a time series of volumetric images of a region of interest at the imaging system, each volumetric image of the time series of volumetric images being captured as a series of two-dimensional slices of the region of interest; and
- a system control comprising a processor and a non-transitory computer readable medium storing instructions executable by the processor, the instructions comprising:
  - a volume simulator configured to calculate a representative value for each voxel over time to create a representative volumetric dataset representing the region of interest and generate, for each slice of the series of two-dimensional slices, a simulated volumetric time series including time series data for the slice and the calculated representative value at all times for the other slices of the series of two-dimensional slices;
  - a slice-to-volume registration component configured to perform a volumetric registration on each of the simulated volumetric time series to provide a set of estimated motion parameters for the slice associated with the simulated volumetric time series, the set of estimated motion parameters comprising a first time series representing rotation around a first axis within a plane of the slice, a second time series representing rotation around second axis within a plane of the slice and perpendicular to the first axis, and a third time series representing a translation along a third axis normal to the plane of the slice; and
  - a slicewise normalization component configured to calculate a first measure of variation for the first time series, calculate a second measure of variation for the second time series, calculate a third measure of variation for the third time series, divide each value in the first time series by the first measure of deviation to provide a first normalized time series, divide each value in the second time series by the second measure of deviation to provide a second normalized time series, and divide each value in the third time series by the third measure of deviation to provide a third normalized time series.

19. The MRI system of claim 18, the instructions further comprising performing a volumetric registration component configured to apply a volumetric reconstruction on the time series of volumetric images of the region of interest to produce volumetric motion parameters for the entire region of interest, the motion parameters including at least a rotation of the volume around the first axis, a rotation of the volume around the second axis, and a translation along a third axis; and
a volumetric normalization component being configured to fit the volumetric motion parameters to the first, second, and third normalized time series to provide a scaling factor for each of the first, second, and third normalized time series and multiplying the values in each of the first, second, and third normalized time series by its associated scaling factor.

20. The MRI system of claim 18, the slicewise normalization component being configured to apply a temporal filter to each of the first normalized time series, the second normalized time series, and the third normalized time series before the volumetric reconstruction is performed.

* * * * *